US006198882B1

(12) United States Patent
Ohmura et al.

(10) Patent No.: US 6,198,882 B1
(45) Date of Patent: Mar. 6, 2001

(54) CAMERA

(75) Inventors: Hiroshi Ohmura; Masao Nakamori, both of Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/416,883

(22) Filed: Oct. 13, 1999

(30) Foreign Application Priority Data

Oct. 15, 1998 (JP) .................................................. 10-293135

(51) Int. Cl.[7] ........................... G03B 13/36; G03B 17/04; G03B 17/50
(52) U.S. Cl. .............................. 396/30; 396/132; 396/349
(58) Field of Search .................................. 396/72, 79, 85, 396/87, 132, 30, 33, 349, 130

(56) References Cited

U.S. PATENT DOCUMENTS

| 4,601,563 | * | 7/1986 | Miyawaki et al. | 396/132 |
| 4,619,510 | * | 10/1986 | Nakanishi | 396/132 |
| 4,881,096 | * | 11/1989 | Ogihara et al. | 396/132 |

FOREIGN PATENT DOCUMENTS 9-236854   9/1997   (JP) .

* cited by examiner

*Primary Examiner*—W. B. Perkey
(74) *Attorney, Agent, or Firm*—Young & Thompson (57) ABSTRACT

In a camera, a stop lock mechanism has a locking click engaged with a driving gear of a peripheral portion of a collapse driving ring to which a driving force is transmitted when an electric motor forward rotates. When an electromagnet is enabled, an engagement of the locking click with the driving gear is released.

6 Claims, 9 Drawing Sheets

CAMERA

BACKGROUND OF THE INVENTION

1. Field of the Invention

The present invention relates to a camera having a plurality of mechanisms driven by an electric motor which is rotatable in both the forward and backward directions, including a lens barrel driving mechanism for performing a drive of extension and collapse of a lens barrel.

2. Description of the Related Art

Hitherto, there are known many types of cameras provided with various mechanisms, for example, a mechanism for performing a drive of extension and collapse of a lens barrel, a focusing mechanism, a film feed mechanism, a film development discharge mechanism in an instant camera and so on. Of the cameras incorporating those mechanisms, there is a camera having such an arrangement that an electric motor is included and those mechanisms are driven by the motor.

As to a camera having such an electric motor, hitherto, in order to reduce the number of motors, there is known such a technical concept that a direction of a rotation of a single electric motor is changed on a switching basis so that the respective mechanisms are driven by the same motor. For example, according to the Japanese Utility Model Registration No. 1869801, there is known such a technology that a single electric motor is used so that a selection mechanism for wide-angle/telephoto of barrel is performed by rotation of the electric motor in a certain direction, and another mechanism, for example, a film feed mechanism or a shutter mechanism, is driven by rotation of the electric motor in a reverse direction.

Further, Japanese Patent Laid Open Gazette Hei. 9-236854 discloses a technology that a single electric motor is used so that a film feed, a film wide and a film rewind are performed by rotation of the electric motor in a certain direction, and another mechanism is driven by rotation of the electric motor in a reverse direction.

The technical concepts disclosed in the above-mentioned publications are to drive different mechanisms in accordance with a direction of a rotation. However, the above-mentioned publications simply propose objects to be driven by a single electric motor, for example, in such a way that a lens mechanism or a film feed mechanism is driven in a certain direction of a rotation, and fails to suggest any solution for problems involved in practical use of the switching driving mechanism.

For example, in the event that different mechanisms are driven in accordance with a forward rotation and a reverse rotation of an electric motor, it is general that a planetary mechanism for switching a transmission of a rotary driving force of the electric motor between those mechanisms. Further, in some schemes of extension and collapse of a lens barrel, there is provided a screw barrel in which extension and collapse of a lens barrel are performed on a rotational transfer basis. In the event that a lens barrel having such a screw barrel is provided, and a planetary mechanism is disposed in such a manner that when a single motor is rotated forward, the lens barrel is driven, and when the motor is rotated reversely, another mechanism is driven, when the electric motor is reversely rotated after the electric motor is rotated forward so that the lens barrel is extended, there is offered such a state that an engagement between the planetary mechanism and the mechanism for driving the lens barrel is released while the lens barrel is kept on extension. This causes a situation that simply touch on the screw barrel by a finger permits a rotation of the screw barrel, so that an extension position of the lens barrel is out of the proper position. Thus, there is a possibility that a photography involving no suitable focusing is performed.

This is the same also in the even that the electric motor is stopped without being reversely rotated, after the electric motor is forwardly rotated to extend the lens barrel. When an external force is applied to the screw barrel in a direction wherein the electric motor is reversely rotated, an engagement between the planetary mechanism and the mechanism for driving the lens barrel is relatively easily released. Thus, this causes the same problem as the event that the motor is reversely rotated.

SUMMARY OF THE INVENTION

In view of the foregoing, it is an object of the present invention to provide a camera preventing an extension position of a lens barrel from being out of a proper position.

To achieve the above-mentioned objects, the present invention provides a camera comprising:

a camera main frame;

an electric motor reversely rotatable;

a lens barrel free in an extension and a collapse with respect to said camera main frame, said lens barrel having a member rotatable in accordance with an extension and a collapse, disposed on a portion exposing in at least an extended state;

a plurality of mechanisms driven in accordance with a forward rotation and a reverse rotation of said electric motor, said plurality of mechanisms including a lens barrel driving mechanism for transmitting one rotation of the forward rotation and the reverse rotation of said electric motor to said lens barrel and for reciprocating said lens barrel between a collapsed state and the extended state in accordance with said one rotation;

a planetary mechanism for transmitting a rotation of said electric motor to said lens barrel driving mechanism and other mechanisms of said plurality of mechanisms excluding said lens barrel driving mechanism in accordance with a rotary direction of the rotation of said electric motor; and a stop lock mechanism for blocking a movement of said lens barrel by detachably engaging with a rotary transmission member rotating when a rotation of said electric motor is transmitted thereto, said constituting said lens barrel or said lens barrel driving mechanism.

A provision of such a stop lock mechanism makes it possible to prevent an extension position of the lens barrel from being varied inadvertently, even if a force in the rotary direction is applied imprudently to the screw barrel of the lens barrel, since the rotation is blocked.

In the camera as mentioned above, it is preferable that said rotary transmission member is a member constituting said lens barrel.

It is acceptable that the rotary transmission member, in which a rotation is blocked by the stop lock mechanism referred to in the present invention, is a member constituting the lens barrel driving mechanism. In such a case, however, there is a possibility that the lens barrel somewhat moves corresponding to the back-lash of gears and the like. To the contrary, in the event that the rotary transmission member, in which a rotation is blocked by the stop lock mechanism referred to in the present invention, is a member constituting the lens barrel, a movement of the lens barrel is directly blocked, and thus it is possible to more reliably prevent the movement of the lens barrel.

Further, in the camera according to the present invention as mentioned above, it is preferable that said stop lock mechanism maintains, while said electric motor drives said lens barrel driving mechanism, a state that an engagement of said stop lock mechanism with said rotary transmission member is released, and said stop lock mechanism maintains, while said electric motor stops and drives said other mechanisms, a state that an engagement of said stop lock mechanism is engaged with said rotary transmission member.

To operate the stop lock mechanism, it is acceptable to provide such an arrangement that a driving force is obtained from an electric motor, and when the electric motor is concerned with a reverse rotation for driving mechanisms other than the lens barrel driving mechanism, the stop lock mechanism is engaged with the rotary transmission member to stop the rotation of the rotary transmission member, and when the electric motor is concerned with a forward rotation for the lens barrel driving mechanism, the engagement is released to drive the lens barrel. In such a case, however, when the electric motor is in the state of a stop without being reversely rotated after the forward rotation, the engagement of the stop lock mechanism with the rotary transmission member is kept on release.

Even in such a case, since the lens barrel is coupled with the electric motor via the lens barrel driving mechanism, the lens barrel is relatively easily maintained at a proper extension position as compared with the state that the electric motor is reversely rotated. However, according to such an arrangement, it is difficult to completely maintain the lens barrel at the proper extension position. In view of the foregoing, as mentioned above, according to the present invention, there is provided such an arrangement that said stop lock mechanism maintains, while said electric motor drives said lens barrel driving mechanism, a state that an engagement of said stop lock mechanism with said rotary transmission member is released, and said stop lock mechanism maintains, while said electric motor stops and drives said other mechanisms, a state that an engagement of said stop lock mechanism is engaged with said rotary transmission member. This feature makes it possible to completely maintain the lens barrel at the proper extension position.

Further, in the camera of the present invention as mentioned above, it is preferable that said stop lock mechanism comprises a locking click engaged with said rotary transmission member, and an electromagnet for moving said locking click between an engagement position engaged with said rotary transmission member and a release position released in an engagement with said rotary transmission member. In this case, it is preferable that said locking click is enabled by a spring force in a direction engaging with said rotary transmission member, and said electromagnet moves said locking click in a direction releasing an engagement with said rotary transmission member against the spring force, when said electromagnet is enabled.

This feature makes it possible to adopt a relatively simple structure and contribute to a compactness, and in addition to engage the locking click with the rotary transmission member in a necessary timing independently of the rotation of the electric motor, or release the engagement of the locking click with the rotary transmission member. In this case, in the event that there is provided such an arrangement that said locking click is enabled by a spring force in a direction engaging with said rotary transmission member, and said electromagnet moves said locking click in a direction releasing an engagement with said rotary transmission member against the spring force, when said electromagnet is enabled, it is sufficient that the electromagnet is enabled only during a relatively short time period necessary for moving the lens barrel and thereby suppressing the power dissipation.

Furthermore, in the camera of the present invention as mentioned above, it is acceptable that said camera is an instant camera of such a type in which a film pack for an instant photography, wherein a plurality of films for an instant photography are laminated in a frame, is mounted on the camera, a film of the most upper layer of the plurality of films laminated in the frame is exposed, and the exposed film is discharged out of the camera while developing developer in the exposed film, and said other mechanisms of said plurality of mechanisms excluding said lens barrel driving mechanism is a film development discharge mechanism through which the exposed film is discharged out of said camera while developing developer into the film.

The present invention is preferably applicable to an instant camera in which the lens barrel driving mechanism or the film development discharge mechanism is driven in accordance with a rotary direction of a single electric motor.

DETAILED DESCRIPTION OF PREFERRED EMBODIMENTS

Embodiments of the present invention will be described with reference to the accompanying drawings.

Figure 1:
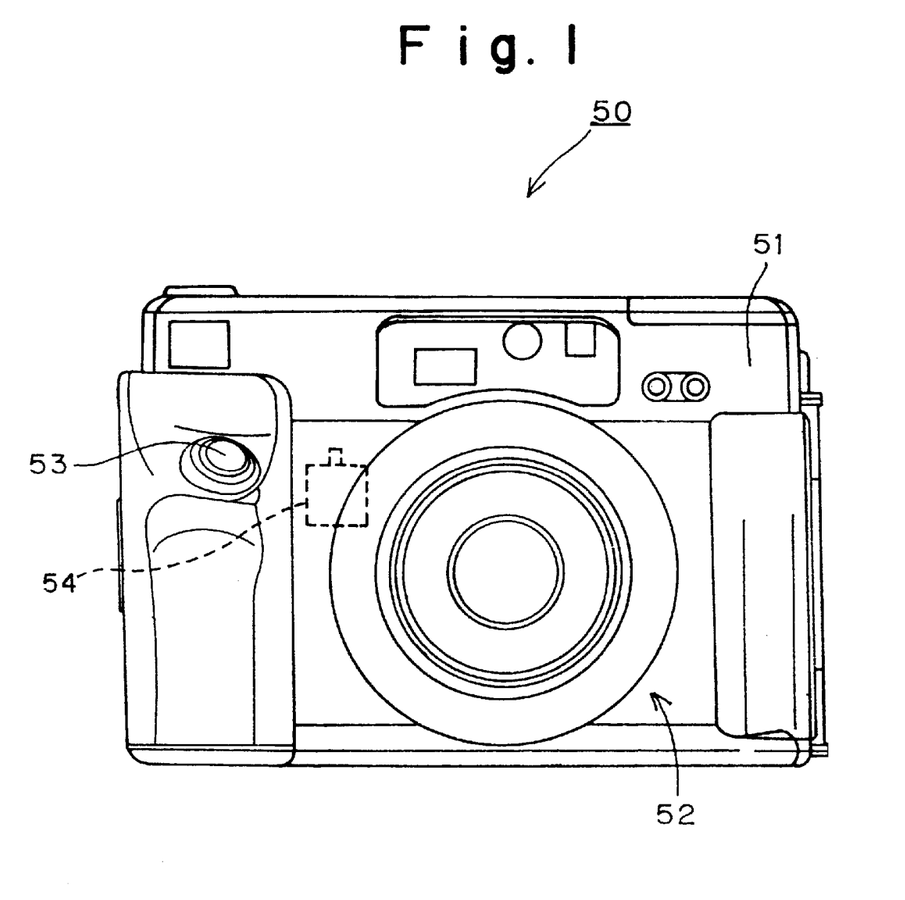
FIG. 1 is a front view of a camera according to a first embodiment of the present invention.

FIG. 1 is a front view of a camera according to a first embodiment of the present invention.

A camera 50 is an instant camera of such a type in which a film pack for an instant photography, wherein a plurality of films for an instant photography are laminated in a frame, is mounted on the camera, a film of the most upper layer of the plurality of films laminated in the frame is exposed, and the exposed film is discharged out of the camera while developing developer in the exposed film.

The camera 50 is provided with a camera frame 51 having a shutter button 53. A lens barrel 52 is mounted on the front of the camera frame 51. The camera frame 51 incorporates therein an electric motor 54 rotatable in both forward and reverse rotative directions.

On the top of the camera, there is formed a film discharge outlet (not illustrated) through which an exposed film is discharged from the inside of the camera 50 to the out side while developing developer into the film.

Figure 2:
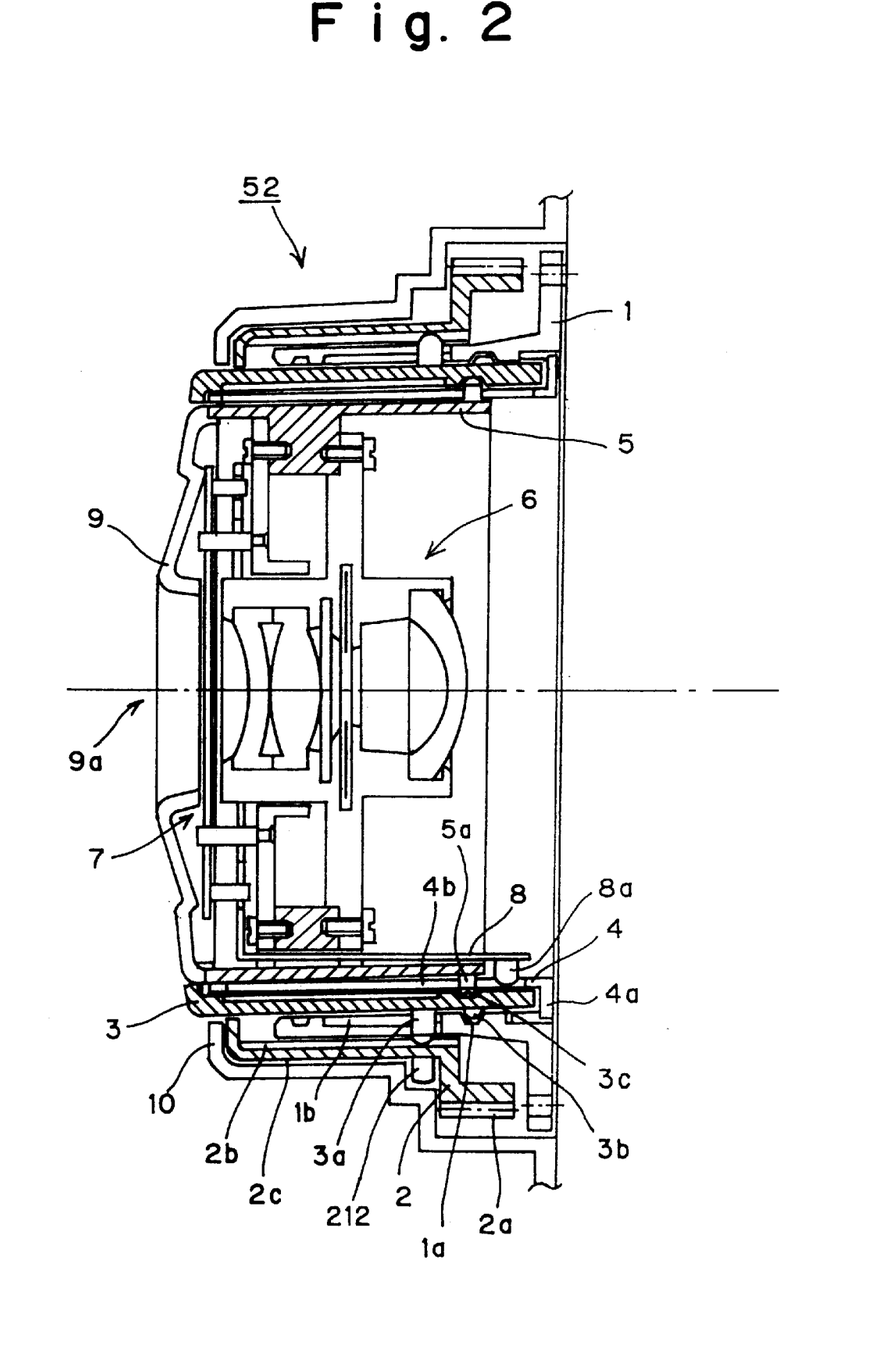
FIG. 2 is a longitudinal sectional view of a lens barrel, which is included in the camera according to the first embodiment, regarding an optical axis direction wherein a screw barrel and a straight barrel, which constitute the lens barrel, is in a collapsed state.

FIG. 2 is a longitudinal sectional view of a lens barrel, which is included in the camera shown in FIG. 1, regarding an optical axis direction wherein a screw barrel and a straight barrel, which constitute the lens barrel, is in a collapsed state.

Figure 3:
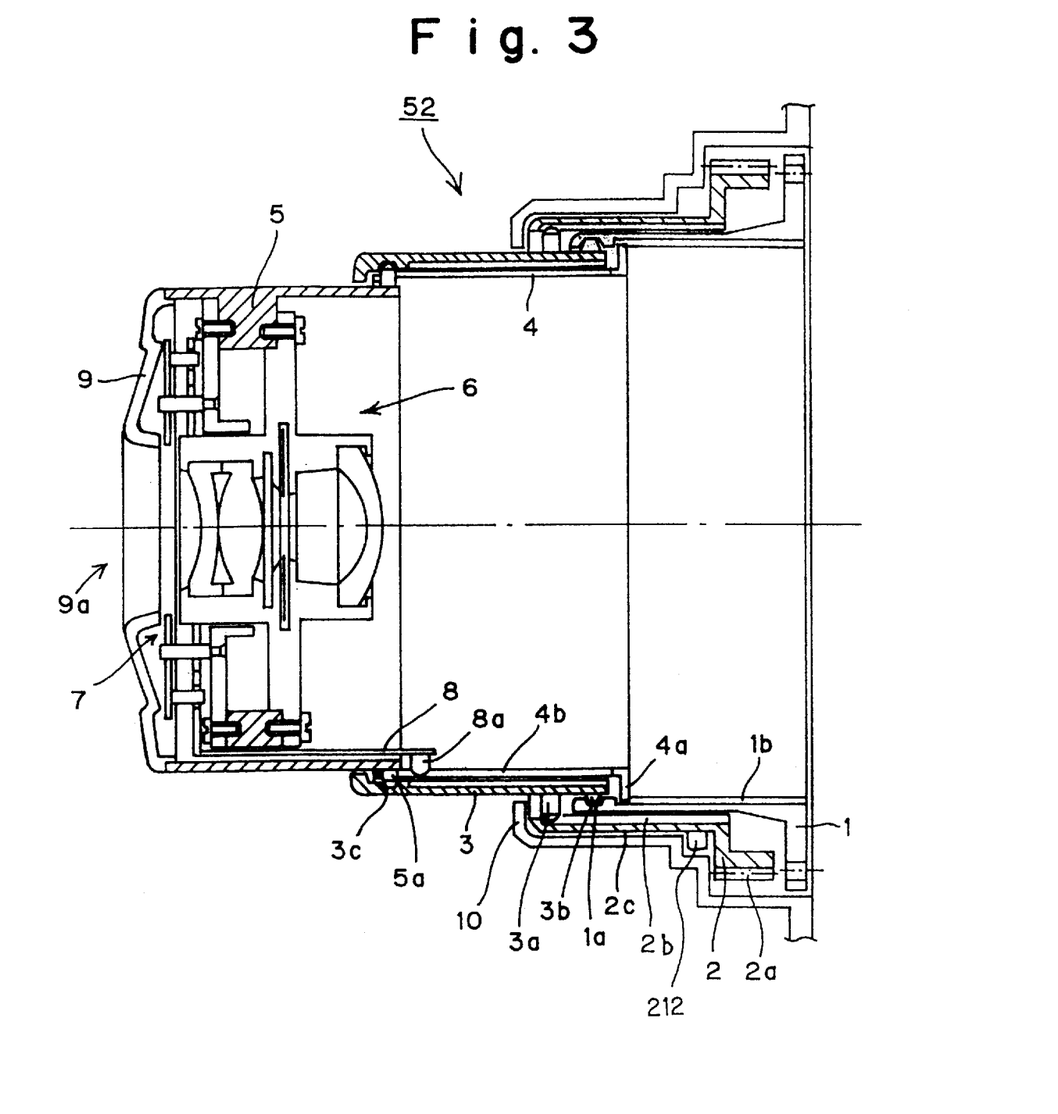
FIG. 3 is a longitudinal sectional view of a lens barrel, which is included in the camera according to the first embodiment, regarding an optical axis direction wherein a screw barrel and a straight barrel, which constitute the lens barrel, is in an extended state.

FIG. 3 is a longitudinal sectional view of a lens barrel, which is included in the camera shown in FIG. 1, regarding an optical axis direction wherein a screw barrel and a straight barrel, which constitute the lens barrel, is in an extended state.

The lens barrel 52 comprises, as shown in FIG. 2, a straight moving barrel 5 incorporating therein a lens shutter set 6, a screw barrel 3 for accommodating the straight moving barrel 5 in a collapsed state, a collapse driving ring 2, and a fixed cam barrel 1. The fixed cam barrel 1 is fixed on the camera frame 51 (cf. FIG. 1). On the inner wall of the fixed cam barrel 1, there are formed a cam groove 1a and three key grooves 1b (FIGS. 2 and 3 show only one key groove 1b of the three key grooves 1b) extending in an optical axis direction. A detailed configuration of the cam groove 1a will be described later. The lens barrel 52 is provided with the collapse driving ring 2 covered with a barrel cover 10. The collapse driving ring 2 is mounted at a position surrounding the outer wall of the fixed cam barrel 1 in such a manner that the collapse driving ring 2 is inhibited from moving in the optical axis direction but permitted to be rotatable on the optical axis. On the rear portion of the outer wall of the collapse driving ring 2, there is formed a driving gear 2a to which a driving force of the electric motor 54 (cf. FIG. 1) disposed inside the camera frame 51 is transmitted. When the driving force of the electric motor 54 is transmitted to the driving gear 2a, the collapse driving ring 2 rotates on the optical axis. On the inner wall of the collapse driving ring 2, there are formed three driving grooves 2b (FIGS. 2 and 3 show only one driving groove 2b of the three driving grooves 2b) extending in an optical axis direction. The three driving grooves 2b are provided on the optical axis at intervals of 120°. On the rear outer wall of the screw barrel 3, there are provided three connecting-pins 3a, which are slidably engaged with the three driving grooves 2b, respectively, and three cam pins slidably engaged with the came groove 1a (FIGS. 2 and 3 show only one cam pin 3b of the three cam pins 3b, and only one connecting-pin 3a of the three cam pins 3b). The three connecting-pins 3a are provided on the optical axis at intervals of 120°. Also the three cam pins 3b are provided on the optical axis at intervals of 120°. On the inner wall of the screw barrel 3, there is formed a cam groove 3c. A detailed configuration of the cam groove 3c will be described later. Further, in the screw barrel 3, a straight key-ring 4 is disposed in a state that the straight key-ring 4 is inhibited in movement in an optical axis direction with respect to the screw barrel 3. On the rear portion of the outer wall of the straight key-ring 4, there are provided three key pins 4a (FIGS. 2 and 3 show only one key pin 4a of the three key pins 4a). Those three key pins 4a are slidably engaged with the three key grooves 1b of the fixed cam barrel 1, respectively. Incidentally, the cam groove 1a and the key grooves 1b of the fixed cam barrel 1, the driving grooves 2b of the collapse driving ring 2, the connecting-pins 3a and the cam pins 3b of the screw barrel 3, and the key pins 4a of the straight key-ring 4 constitute a cam mechanism for performing extension and collapse of the screw barrel 3 and the straight key-ring 4. As to the state of the extension and collapse of the screw barrel 3 and the straight key-ring 4 will be described later.

In the straight moving barrel 5, a lens cover open and close member 8 for opening and closing a lens cover is fixed. On the rear portion of the lens cover open and close member 8, there is provided a guide pin 8a entering a straight guide groove 4b of the straight key-ring 4. On the rear end peripheral portion, there are provided three cam pins 5a which penetrate the straight key-ring 4 and slidably engage with the cam groove 3c of the screw barrel 3 (FIGS. 2 and 3 show only one cam pin 5a of the three cam pins 5a). Those three cam pins 5a are provided on the optical axis at intervals of 120° in a circumferential direction. The cam pins 5a of the straight moving barrel 5, the guide pin 8a of the lens cover open and close member 8, the cam groove 3c of the screw barrel 3, and the straight guide groove 4b of the straight key-ring 4 constitute a cam mechanism for performing the straight extension and collapse of the straight moving barrel 5 in the optical axis direction.

Hereinafter, there will be described the manner that the screw barrel 3 and the straight moving barrel 5 are extended and collapsed in the optical axis direction in accordance with a rotation of the collapse driving ring 2, referring to FIGS. 4 and 5.

Figure 4:
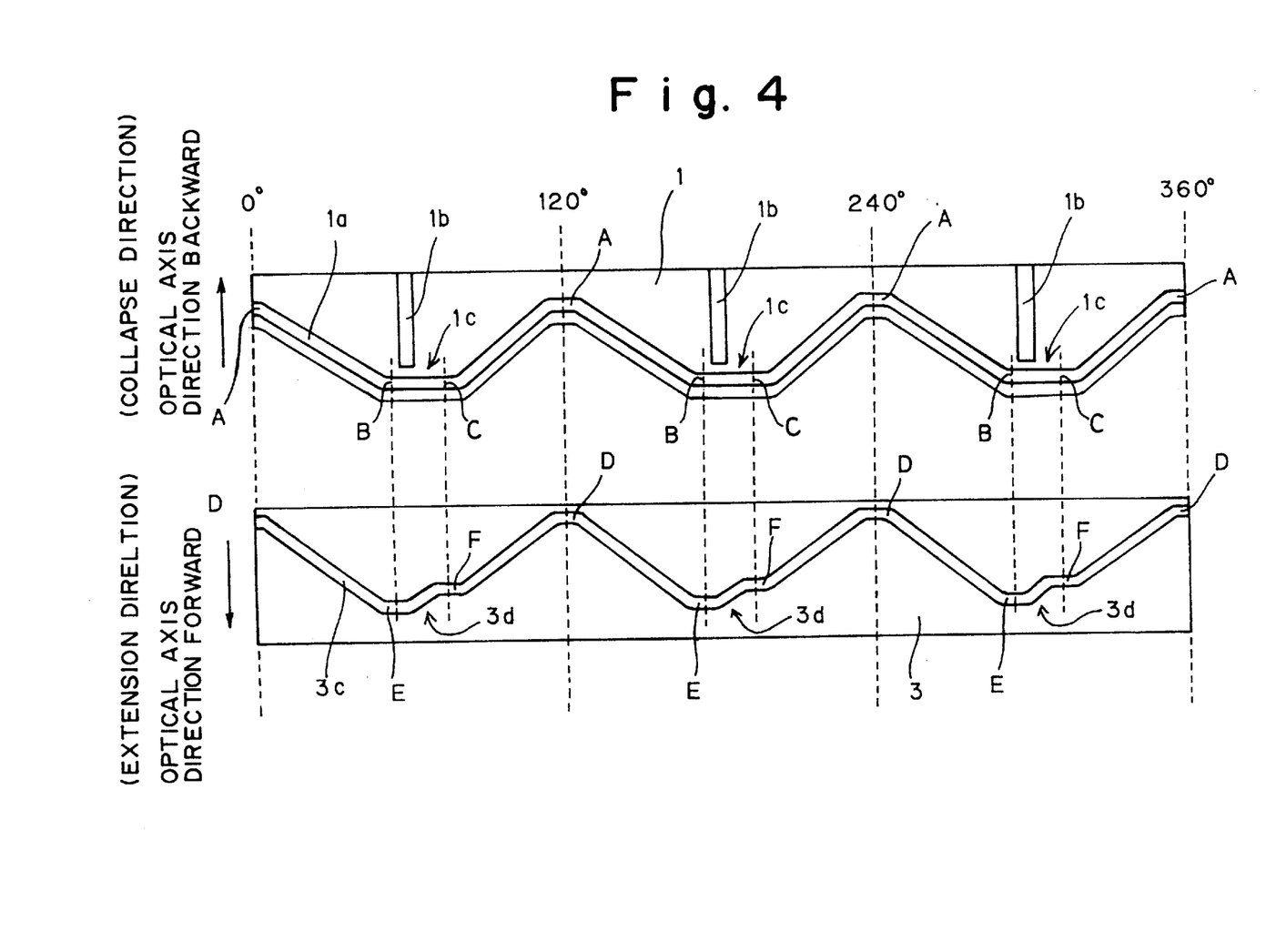
FIG. 4 is a view of a fixed cam barrel and a screw barrel, in which the inner walls of those barrels are developed in a direction perpendicular to an optical axis direction.

FIG. 4 is a view of a fixed cam barrel and a screw barrel, in which the inner walls of those barrels are developed in a direction perpendicular to an optical axis direction. It is noted that the axis of abscissas denotes an angle on the optical axis, but not an actual size ratio of the inner walls.

On the screw barrel 3, there is formed the cam groove 3c with which three cam pins 5a (cf. FIG. 3) of the straight moving barrel 5 are engaged. The cam groove 3c is an endless cam groove making one circuit of a photographic axis wherein during one circuit the forward movement and the backward movement are repeated three times in the optical axis direction. The cam groove 3c has a two-stage 3d on a portion passing through the front of the optical axis direction.

On the other hand, on the fixed cam barrel 1, there is formed the cam groove 1a with which three cam pins 3b (cf. FIG. 3) of the screw barrel 3 are engaged. The cam groove 1a is an endless cam groove making one circuit of a photographic axis wherein during one circuit the forward movement and the backward movement are repeated three times in the optical axis direction. The cam groove 1a has a flat 1c, which extends in a direction perpendicular to the optical axis direction, on a portion associated with the whole area of the two-stage 3d of the cam groove 3c of the screw barrel 3. At the back of the flat 1c, there is formed a key groove 1b extending in the optical axis direction.

Here, a method of detecting a barrel position will be explained, and then the description will be returned to the explanation of the extension and collapse operation.

Figure 5:
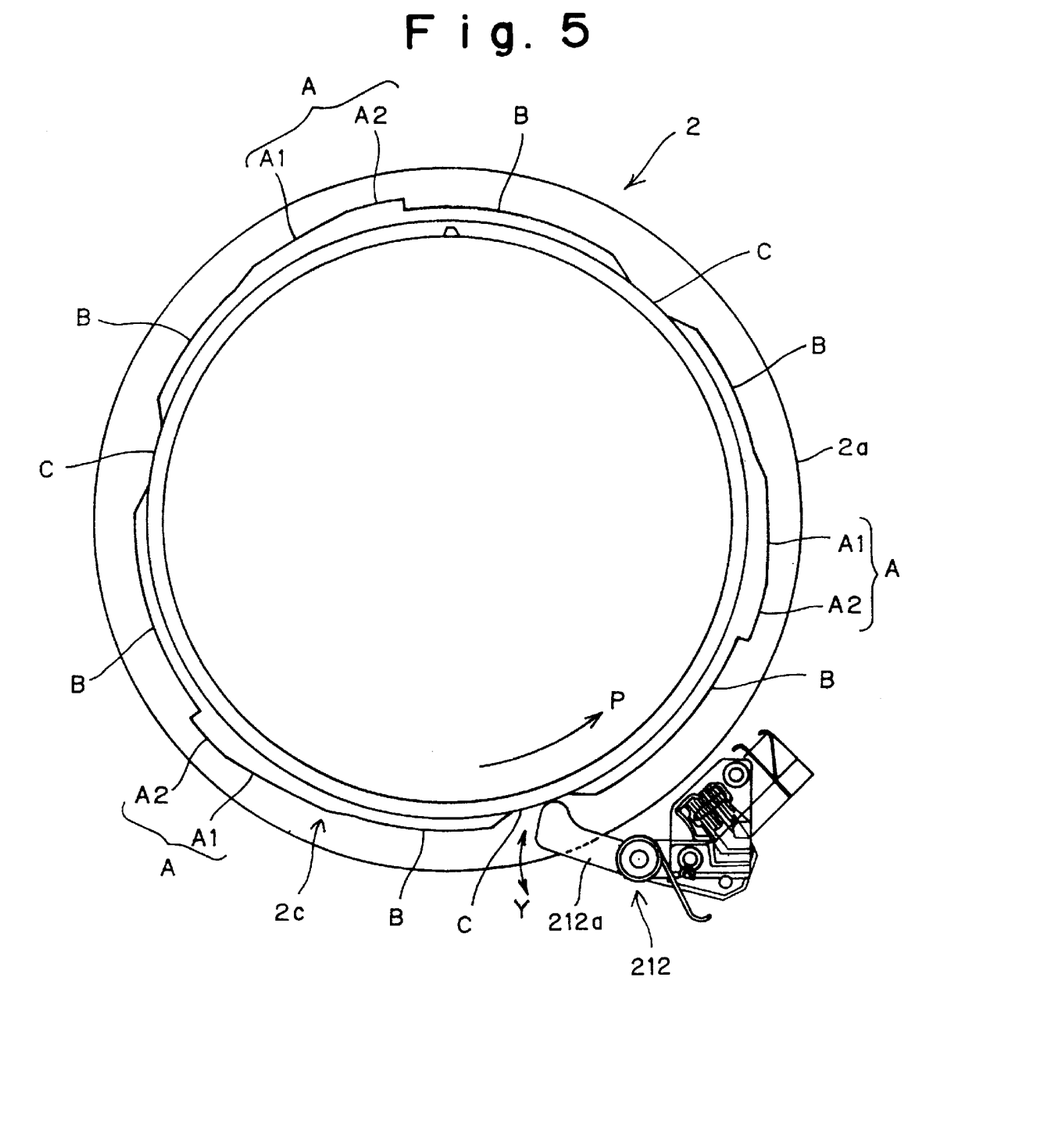
FIG. 5 is a front view of a collapse driving ring and a barrel position detection switch.

FIG. 5 is a front view of a collapse driving ring and a barrel position detection switch.

The driving gear 2a is formed on the rear portion of the outer wall of the collapse driving ring 2, and a cam surface 2c is formed throughout the front side of the outer wall of the collapse driving ring 2. The cam surface 2c is formed in such a manner that the cam surface 2c is varied in its height in accordance with the extending state, the collapsed state, and the intermediate state between the extending state and the collapsed state, of both the screw barrel 3 and the straight moving barrel 5. That is, the cam surface 2c has an area A associated with the extending state, an area C associated with the collapsed state, and an area B associated with the intermediate state between the extending state and the collapsed state. Here, the extending state of the straight moving barrel 5 is concerned with a first extending position and a second extending position which are different in extending amount. And the area A according to the extending state of the cam surface 2c has an area A1 associated with the first extending position, and an area A2 associated with the second extending position, wherein the areas A1 and A2 are different in height in accordance with the two positions involved in the mutually different extending amount. Accordingly, the cam surface 2c has four areas formed in mutually different height, that is, the areas A1, A2, B and C. Those four areas A1, A2, B and C are formed on areas of the cam surface 2c divided into three parts in a round direction of the optical axis. A barrel position detection switch 212 is in contact with the cam surface 2c. As the collapse driving ring 2 rotates, height of a portion of the cam surface 2c contacting with a lever 212a of the barrel position detection switch 212 is varied, and the lever 212a rotationally moves in a direction of an arrow Y. At that time, the state of the contact of the barrel position detection switch 212 is varied, so that it is detected in accordance with the state of the contact as to which area of the areas A1, A2, B and C of the cam surface 2c the lever 212a of the barrel position detection switch 212 is in contact with, and thereby recognizing the state and the focus position of the screw barrel 3 and the straight moving barrel 5.

In FIG. 4, when the three cam pins 3b (cf. FIG. 2) of the screw barrel 3 are located at the three collapse positions A of the cam groove 1a of the fixed cam barrel 1, respectively, and when the three cam pins 5a (cf. FIG. 2) of the straight moving barrel 5 are located at the three collapse positions D of the cam groove 3c of the screw barrel 3, respectively, the screw barrel 3 and the straight moving barrel 5 are collapsed within the fixed cam barrel 1 (cf. FIG. 2). At that time, the lever 212a of the barrel position detection switch 212 is in contact with a portion C, which is the lowest in height, of the cam surface 2c of the collapse driving ring 2, as shown in FIG. 5. Now, when a power source of the camera frame 51 is turned on, the electric motor 54 rotates forward, so that the collapse driving ring 2 rotates on the optical axis in a direction of an arrow P (cf. FIG. 4). At that time, since the three connecting-pins 3a of the screw barrel 3 are engaged with the three driving grooves 2b (cf. FIG. 2) of the collapse driving ring 2, respectively, the screw barrel 3 rotates on the optical axis through the connecting-pins 3a. Now, since the three cam pins 3b of the screw barrel 3 are engaged with the cam groove 1a of the fixed cam barrel 1, the three cam pins 3b are moved under guidance of the cam groove 1a from the collapse position A to the first extension position B defining the extension amount of the screw barrel 3 to the maximum extension amount, whereby the screw barrel 3 is extended. At that time, since the key pins 4a are engaged with the key grooves 1b of the fixed cam barrel 1, the straight key-ring 4 is straightly extended while the screw barrel 3 is rotatably extended. The cam pins 5a of the straight moving barrel 5 are engaged with the cam groove 3c of the screw barrel 3, and the guide pin 8a (cf. FIG. 2) enters the straight guide groove 4b of the straight key-ring 4, the cam pins 5a of the straight moving barrel 5 are moved from the collapse position D to the first extension position E, whereby the straight moving barrel 5 is straightly extended while the cam pins 3b of the screw barrel 3 are moved from the collapse position A to the first extension position B. When the three cam pins 3b of the screw barrel 3 and the three cam pins 5a of the straight moving barrel 5 move to the first extension positions B and E, respectively, the lever 212a of the barrel position detection switch 212 slides on the portion B of the portions A1, A2, B and C, which are mutually different in height, of the cam surface 2c of the collapse driving ring 2.

According to the present embodiment, as the initial set of the focal position of the lens shutter set when the power source is turned on, the position for the short range photography is selected. When the lever 212a is in contact with the portion A1 associated with the first extension position, of the cam surface 2c of the collapse driving ring 2 in accordance with the rotation of the collapse driving ring 2, the electric motor 54 stops in rotation and thus the collapse driving ring 2 stops. At that time, the three cam pins 3b of the screw barrel 3 and the three cam pins 5a of the straight moving barrel 5 stop at the first extension positions B and E, respectively, so that the extension of the screw barrel 3 and the straight moving barrel 5 stop. When the screw barrel 3 and the straight moving barrel 5 stop at the first extension positions B and E, respectively, the focal point of the lens shutter set is set to the position for the short range photography.

In the event that as the focal position of the lens shutter set, the position for the long range photography is selected through an operation of a predetermined far-and-near selecting operating switch, the electric motor 54 rotates forward once more. And when the lever 212a is in contact with the portion A2 associated with the second extension position, of the cam surface 2c of the collapse driving ring 2, the electric motor 54 stops in rotation and thus the collapse driving ring 2 stops. At that time, the cam pins 3b of the screw barrel 3 stop at the second extension position C which is the same as the first extension position A in extension amount, and the cam pins 5a of the straight moving barrel 5 stop at the second extension position F defining the extension amount of the straight moving barrel 5 to the extension amount which is slightly smaller than the first extension position E. When the cam pins 5a of the straight moving barrel 5 stop at the second extension position F, the focal point of the lens shutter set is set up to the position for the long range photography. In this manner, according to the camera 50, the extension amount of the straight moving barrel 5 is varied in two steps in accordance with the short range photography and the long range photography, and thereby performing positional control of the focal point of the lens shutter set. When the power source of the camera is operated to turn off, before the power source of the camera is actually turned off, the electric motor 54 rotates forward once more, so that the collapse driving ring 2 rotates in a direction P, the cam pins 3b of the screw barrel 3 move from the first extension position B or the second extension position C to the collapse position A, and the cam pins 5a of the straight moving barrel 5 move from the first extension position E or the second extension position F to the collapse position D. At that time, the lever 212a of the barrel position detection switch 212 slides on the portion B associated with an intermediate state between the extended state and the collapsed state, of the cam surface 2c of the collapse driving ring 2, as shown in FIG. 5.

By further rotating the collapse driving ring 2, when the lever 212a is in contact with the portion C associated with the collapsed state, of the cam surface 2c, the electric motor 54 stops in rotation and thus the collapse driving ring 2 stops. At that time, the three cam pins 3b of the screw barrel 3 and the three cam pins 5a of the straight moving barrel 5 reach the collapse positions A and D, respectively, so that the collapse of the screw barrel 3 and the straight moving barrel 5 is completed.

In the event that the far-and-near selecting operational switch is operated in the state that the focal point of the lens shutter set is set up to the long range photography, the electric motor 54 rotates forward, and the screw barrel 3 and the straight moving barrel 5 are extended again via the collapsed state once, and set up to the extending position for the short range photography.

On the front of the lens shutter set 6 of the straight moving barrel 5, a lens cover set 7 is mounted. On the front of the lens cover set 7, an accessory name plate 9 having an aperture 9a is mounted. The lens cover set 7 is controlled by a lens cover opening and closing member 8 in such a manner that when the straight moving barrel 5 is extended, the lens cover set 7 is opened, and when the straight moving barrel 5 is collapsed, the lens cover set 7 is closed.

As mentioned above, according to the camera 50, only a forward rotation of the electric motor 54 makes it possible to perform an extension and a collapse of the screw barrel 3 and the straight moving barrel 5, and the focusing as well. The camera 50 is provided with a planetary mechanism (which will be describe later) for switching a transmission destination of a driving force of the electric motor 54 in accordance with a forward rotation and a reverse rotation of the electric motor 54. The planetary mechanism is arranged in such a manner that when the electric motor 54 rotates forward, a driving force of the electric motor 54 is transmitted to the collapse driving ring 2, on the other hand, when the electric motor 54 rotates reversely, a driving force of the electric motor 54 is transmitted to a film development discharge mechanism (which will be described later). In this manner, according to the camera 50, a single electric motor 54 is used as a driving source for extension and collapse of the lens barrel and also as a driving source for the film development discharge mechanism. Further, according to the camera 50, the cam groove 3c formed on the screw barrel 3 has the two-stage 3d adapted for stopping the straight moving barrel 5 at anyone of the first extension position E and the second extension position F which are different from one another in extension amount. A focusing is performed in accordance with the stopped extension position of the cam pins 5a of the straight moving barrel 5 between the first extension position E and the second extension position F.

Figure 6:
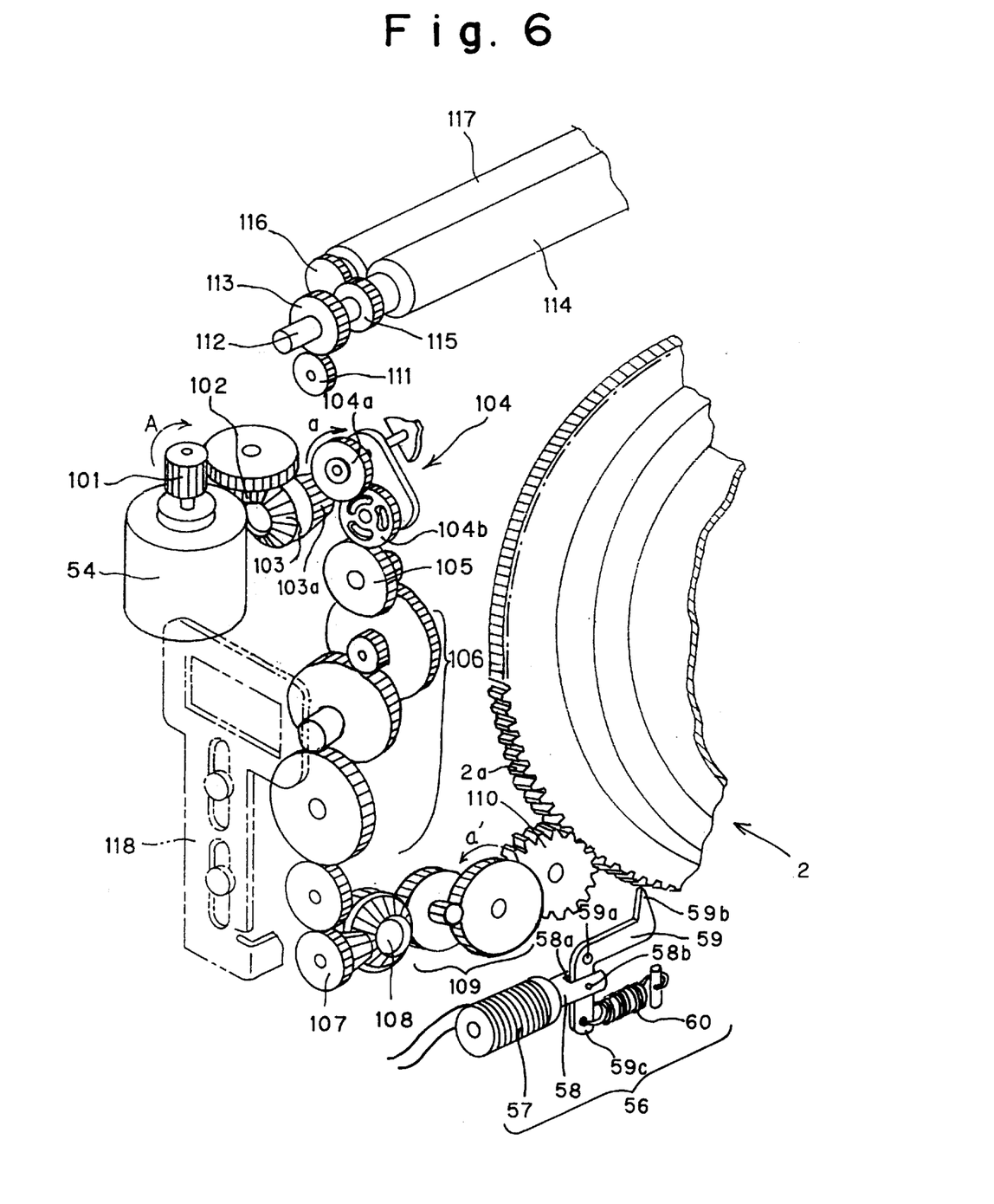
FIG. 6 is an illustration showing a state that a planetary mechanism is switched to a side wherein a driving force of an electric motor is transmitted to a lens barrel.

FIG. 6 is an illustration showing a driving force transmission mechanism for transmitting a driving force of the electric motor to the collapse driving ring and the film development discharge mechanism in accordance with a direction of a rotation of the electric motor. FIG. 6 shows a state that a planetary mechanism is switched to a side wherein a driving force of an electric motor is transmitted to a lens barrel.

A motor gear 101 is mounted on the electric motor 54. The electric motor 54 is a reversible motor. In the state shown in FIG. 6, the electric motor 54 rotates in a direction of an arrow A (hereinafter, the rotation of the electric motor 54 in a direction of an arrow A is referred to as the forward rotation). The driving force of the electric motor 54 is transmitted from the motor gear 101 via a bevel gear 102 and a bevel gear 103 to a planetary mechanism 104. A sun gear 104a constituting the planetary mechanism 104 receives a rotary force in a direction of an arrow a as the electric motor 54 rotates in a direction of an arrow A, and rotatably moves to an engagement gear 105 side in accordance with the rotary force and engages with the engagement gear 105. Thus, the driving force transmitted to the planetary mechanism 104 is transmitted via the sun gear 104a and the planetary gear 104b, which constitute the planetary mechanism 104, to the engagement gear 105, and further to a reduction gear train 106. The driving force transmitted to the reduction gear train 106 is transmitted via two bevel gears 107 and 108 to a reduction gear 109, and further to an engagement gear 110. The engagement gear 110 is engaged with the driving gear 2a formed around the collapse driving ring 2, so that the driving force transmitted to the engagement gear 110 is transmitted to the driving gear 2a whereby the collapse driving ring 2 rotates. As the collapse driving ring 2 rotates, as mentioned above, the screw barrel 3 and the straight moving barrel 5 are extended. And as the collapse driving ring 2 further rotates, the screw barrel 3 and the straight moving barrel 5 are collapsed again.

Incidentally, with respect to unevenness of teeth of the gear, only the engagement gear 110 and part of the driving gear 2a of the collapse driving ring 2 are clearly illustrated. This is so made for the purpose of simplification of the illustration, but it should be understood that other gears and other portion of the driving gear 2a of the collapse driving ring 2 are also formed with unevenness of teeth of the gear.

Here, the collapse driving ring 2 corresponds to an example of the rotary transmission member referred to in the present invention. At the position closed to the collapse driving ring 2, there is disposed a stop lock mechanism 56 for blocking a rotation of the collapse driving ring 2, or a translation of the lens barrel. The stop lock mechanism 56 is detachably engaged with the driving gear 2a of the collapse driving ring 2. The stop lock mechanism 56 comprises an electromagnetic 57, a driving shaft 58, a stop lock lever 59 and a draft spring 60.

The electromagnetic 57 attracts the driving shaft 58 inside at the time of a conduction, and release the driving shaft 58 at the time of a non-conduction.

A body portion of the driving shaft 58 is inserted into the inside of the electromagnetic 57. At a fork portion 58a of the tip of the driving shaft 58, the stop lock lever 59 is coupled with the driving shaft 58 by a spindle 58b in such a manner that the stop lock lever 59 is rotatably movable.

The stop lock lever 59 is supported by a spindle 59a on a pivotal basis in such a manner that the stop lock lever 59 is rotatably movable with respect to the main frame of the camera. On the tip of the stop lock lever 59, there is formed a locking click 59b capable of being engaged with the driving gear 2a of the collapse driving ring 2. At the rear end of the stop lock lever 59 beyond the spindle 59a, the draft spring 60 is engaged in such a manner that the stop lock lever 59 is enabled by a spring force counterclockwise, that is, in a direction that the locking click 59b is engaged with the driving gear 2a.

FIG. 6 shows a state that the electromagnetic 57 is in a conduction. In this state, the driving shaft 58 is attracted to the electromagnetic 57 against the spring force of the draft spring 60, so that the stop lock lever 59 rotates clockwise and whereby an engagement of the locking click 59b with the driving gear 2a is released.

In this condition, the electric motor 54 is rotatable in a forward rotative direction. The forward rotation of the electric motor 54 permits the collapse driving ring 2 to rotate so that the lens barrel is extended or collapsed.

Figure 7:
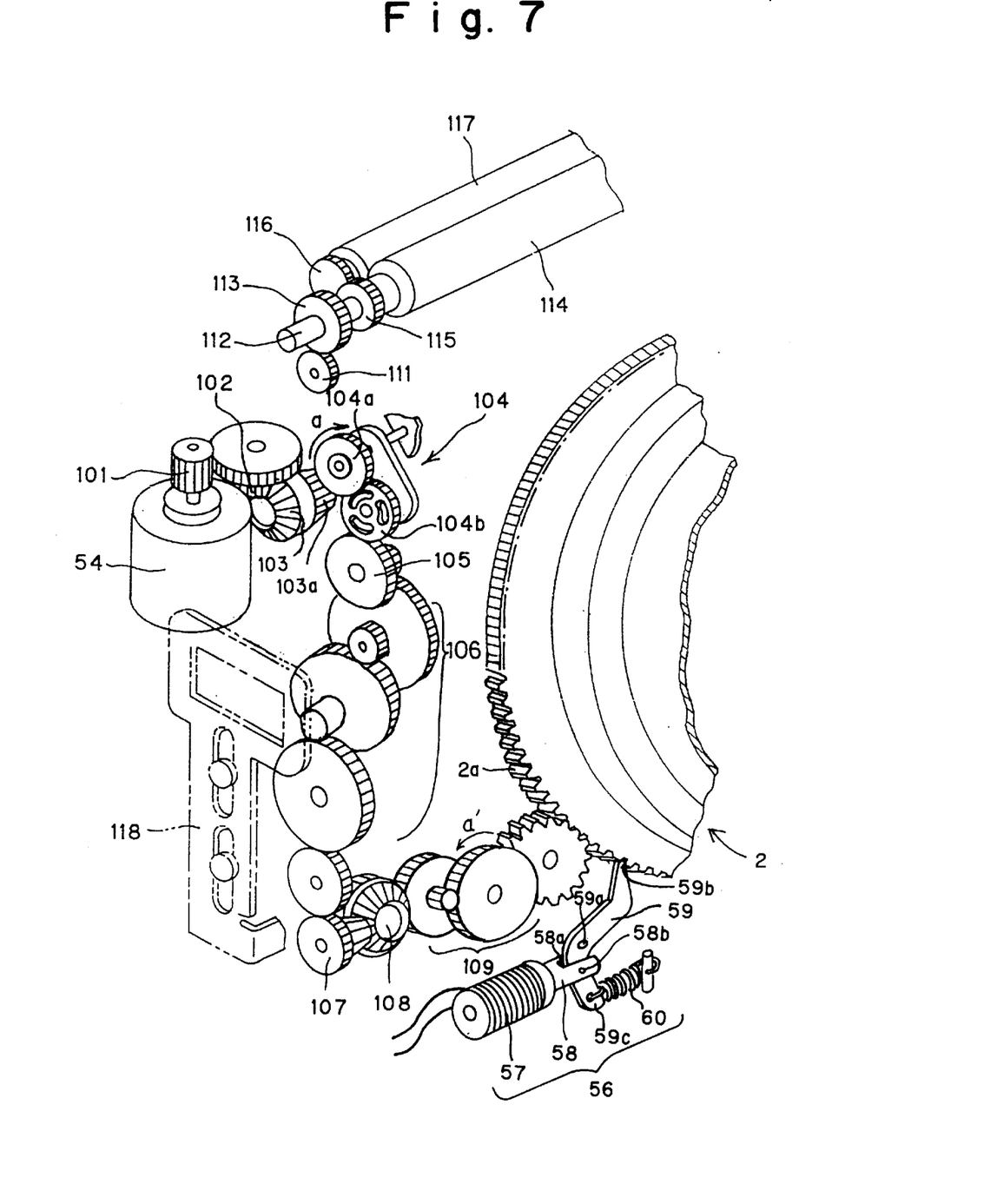
FIG. 7 is an illustration showing a state that a planetary mechanism is switched to a side wherein a driving force of an electric motor is transmitted to a lens barrel.

FIG. 7 is, similar to FIG. 6. an illustration showing a driving force transmission mechanism for transmitting a driving force of the electric motor to the collapse driving ring and the film development discharge mechanism. FIG. 7 shows a state that the electric motor is in a stop condition after the forward rotation.

In this condition, the electromagnetic 57 constituting the stop lock mechanism 56 is in a non-conduction. Consequently, the stop lock lever 59 is enabled counter-clockwise by the spring force of the draft spring 60, so that the locking click 59b is engaged with the driving gear 2a of the collapse driving ring 2.

Figure 8:
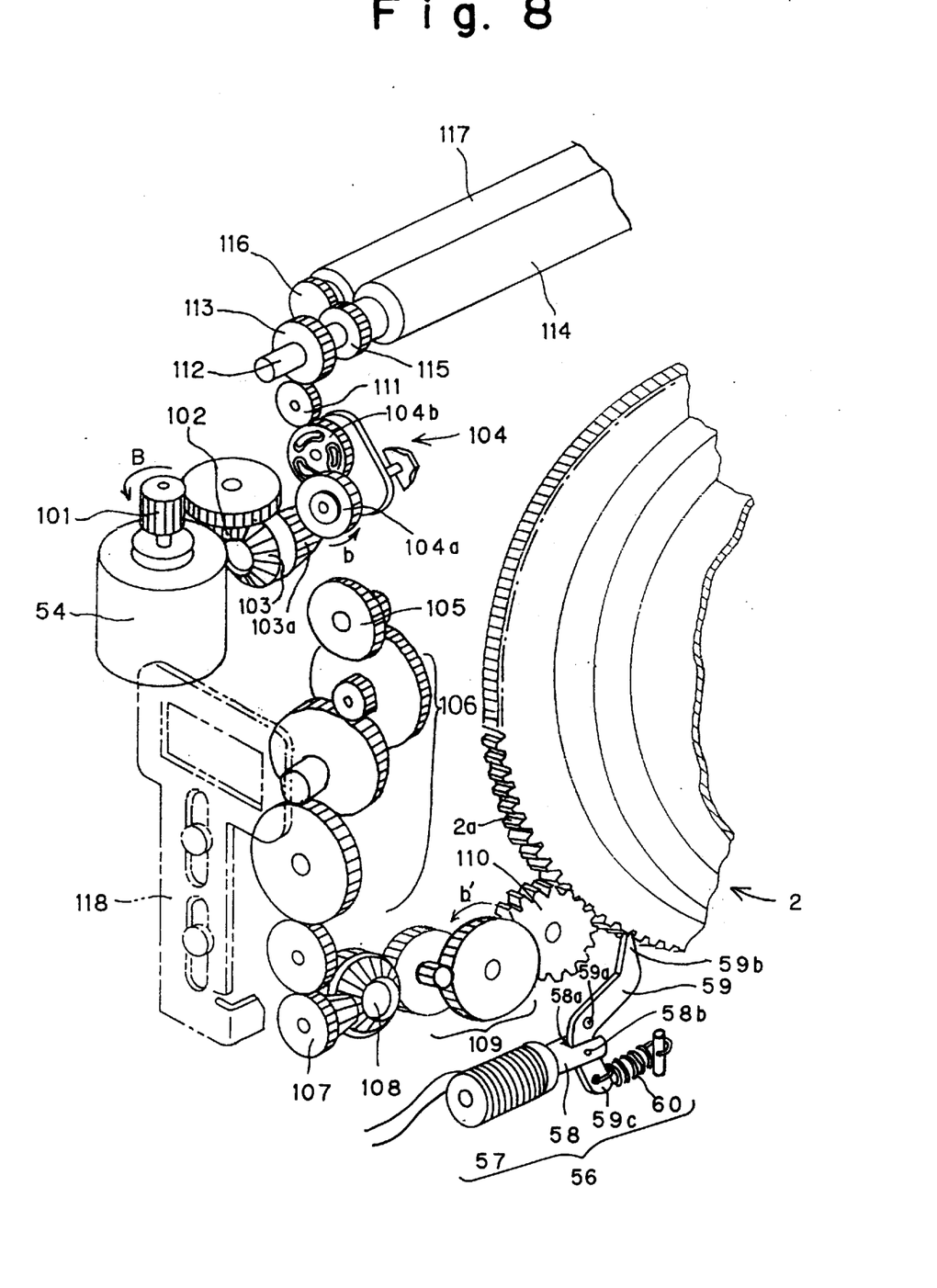
FIG. 8 is an illustration showing a state that a planetary mechanism is switched to a side wherein a driving force of an electric motor is transmitted to a film feed roller.

FIG. 8 is an illustration showing a state that a planetary mechanism is switched to a side wherein a driving force of an electric motor is transmitted to a film feed roller.

In FIG. 8, the electric motor 54 rotates in a direction of an arrow B (hereinafter, the rotation of the electric motor 54 in a direction of an arrow B is referred to as the reverse rotation). The driving force of the electric motor 54 is transmitted, in a similar fashion to that of the forward rotation of the electric motor 54 (cf. FIG. 6), from the motor gear 101 via the bevel gear 102 and the bevel gear 103 to the planetary mechanism 104. When the driving force is transmitted to the planetary mechanism 104, the sun gear 104a constituting the planetary mechanism 104 receives a rotary force in a direction of an arrow b, and the planetary gear 104b rotatably moves to an engagement gear 111 side in accordance with the rotary force and engages with the engagement gear 111. Thus, the driving force transmitted to the planetary mechanism 104 is transmitted via the sun gear 104a and the planetary gear 104b, which constitute the planetary mechanism 104, and further via the engagement gear 111 to a development roller driving gear 113 engaged with the engagement gear 111. The development roller driving gear 113 is mounted on a spindle 112. A driving side development roller 114 is also mounted on a spindle 112. Thus, when a driving force is transmitted to the development roller driving gear 113, the driving side development roller 114 rotates. An engagement gear 115 is mounted between the development roller driving gear 113 and the driving side development roller 114. The engagement gear 115 is engaged with another engagement gear 116 which is mounted on a follower side development roller 117 disposed against the driving side development roller 114. Consequently, when the driving force of the electric motor 54 is transmitted to the engagement gear 111, the driving force is transmitted not only to the driving side development roller 114, but also via the engagement gear 115 and the engagement gear 116 to the follower side development roller 117. The engagement gear 111 engaged with the development roller driving gear 113 is engaged with a gear train (not illustrated) coupled with a claw driving lever plate 118. Thus, as shown in FIG. 8, in the event that the planetary mechanism 104 transmits the driving force of the electric motor 54 to the engagement gear 111, the driving force of the electric motor 54 transmitted to the engagement gear 111 is transmitted not only the driving side development roller 114 and the follower side development roller 117, but also the claw driving lever plate 118. As the driving force is transmitted to the claw driving lever plate 118, the claw driving lever plate 118 goes up once and then goes down. When the claw driving lever plate 118 goes up, a film of the most upper layer of a plurality of exposed films in a film cartridge (not illustrated) is pushed up, so that the upper edge of the film enters between the driving side development roller 114 and the follower side development roller 117. The upper edge portion of the film is provided with a portion in which a developer is contained. This portion containing the developer is broken when the film is put between the driving side development roller 114 and the follower side development roller 117 in accordance with a rotation of the driving side development roller 114 and the follower side development roller 117. A further rotation of the driving side development roller 114 and the follower side development roller 117 causes the developer to be developed in the film and the film to be discharged out of the camera.

During a period of time when the electric motor 54 rotates reversely, and during a period of time when the electric motor 54 stops but not rotates after the reverse rotation, the electromagnetic 57 is in a state of a non-conduction. Thus, the locking click 59b is in a state that it is engaged with the driving gear 2a of the collapse driving ring 2.

In the event that the stop lock mechanism 56 shown in FIGS. 6 to 8 is not provided, in the state as shown in FIG. 7, that is, in a state that the planetary mechanism 104 engages with the engagement gear 105 constituting the lens barrel driving mechanism and the electric motor 54 stops, if the screw barrel 3 (cf. FIG. 3) constituting the lens barrel receives a force in the reverse rotation direction, the force is transmitted via the lens barrel driving mechanism to the planetary mechanism 104. As a result, since the reverse rotation is involved in a direction having idle in view of the back-lash of a gear, the planetary mechanism 104 may rotate in the reverse direction to a certain extent without a rotation of the electric motor 54, and the engagement of the engagement gear 105 with the engagement gear 105 may be released. Thus, there is a possibility that a slight touch on the screw barrel 3 by a finger causes an extension position of the lens barrel to vary, so that the extension position of the lens barrel moves, for example, from the extension position E shown in FIG. 4 to the extension position F or the intermediate state between the extended state and the collapsed state. This brings about a possibility of out-of-focus photography. This is the same also in the event that the engagement of the planetary mechanism 104 with the lens driving mechanism is released by a reverse rotation of the electric motor 54 as shown in FIG. 8.

To the contrary, according to the present embodiment, the camera is provided with the stop lock mechanism 56 as shown in FIGS. 6 to 8. A provision of such a stop lock mechanism 56 makes it possible to prevent an extension position of the lens barrel from being varied inadvertently, even if a force in the rotary direction is applied imprudently to the screw barrel 3 of the lens barrel, since the rotation is blocked.

According to the present embodiment, the stop lock mechanism 56 is arranged so as to engage with the collapse driving ring 2 constituting the lens barrel. As mentioned above, while it is acceptable that the stop lock mechanism 56 is arranged so as to engage with the member constituting the lens barrel, it is alternatively acceptable that the stop lock mechanism 56 is arranged so as to engage with the lens barrel driving mechanism before a transmission of the driving force of the electric motor 54 to the collapse driving ring 2. Specifically, it is acceptable that the stop lock mechanism 56 is arranged so as to engage with anyone of the engagement gear 105 engaged with the planetary gear 104b of the planetary mechanism 104 to the engagement gear 110 engaged with the driving gear 2a.

Figure 9:
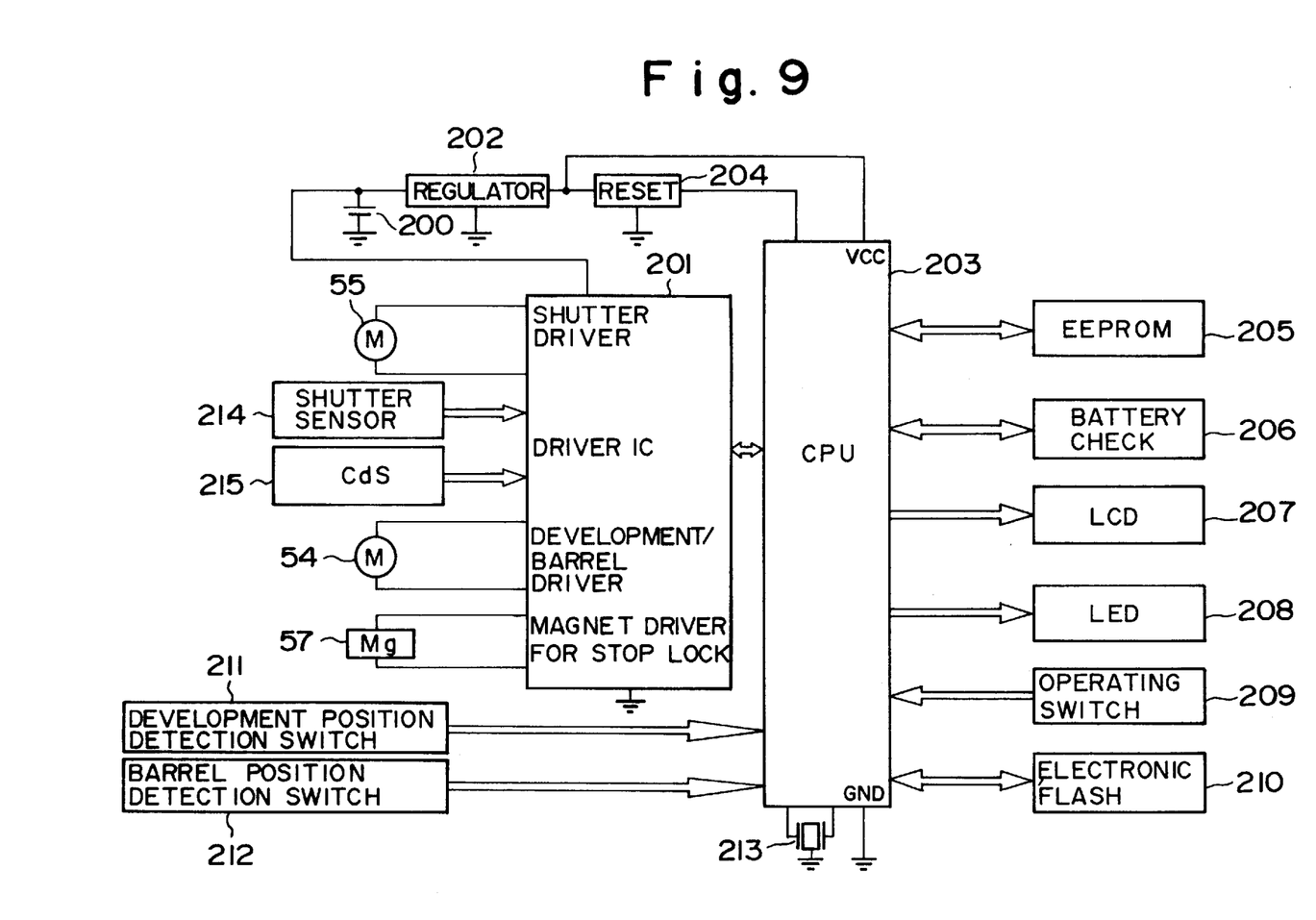
FIG. 9 is a circuit block diagram of the camera according to the present embodiment.

FIG. 9 is a circuit block diagram of the camera according to the present embodiment.

An electric power from an integral battery 200 is supplied directly to an IC driver 201, and also supplied via a regulator 202 to a CPU 203 with a stabilization. An output voltage of the regulator 202 is monitored by a reset circuit 204. The reset circuit 204 serves to stop an operation of the CPU 203 to prevent a run-away of an operation of a camera, when the output voltage of the regulator 202 goes down to the lowest voltage at which the CPU 203 operates normally. Connected to the CPU 203 are an EEPROM 205 storing a various sort of programs to be executed in the CPU 203 and data, a battery check circuit 206 for monitoring a residual capacity of the integral battery 200, a finder-inside liquid-crystal display (LCD) 207 for performing a various sort of displays in a finder, a displaying LED 208, a various sort of operating switches 209 including the above-mentioned far-and-near selecting operating switch, an electronic flash circuit 210, a development position detection switch 211 for detecting a movement of the claw driving lever plate 118 (cf. FIGS. 6 and 7) and a barrel position detection switch 212 for detecting a rotary position (states of the straight moving barrel 5 and the screw barrel 3 and the focal position) of the collapse driving ring 2. The CPU 203 receives instructions and information, and performs a control. Further, connected to the CPU 203 is a crystal oscillator 213 for generating a basic clock necessary for an operation of the CPU 203. Furthermore, connected to the CPU 203 is the above-mentioned IC driver 201. The IC driver 201 drives two electric motors 54 and 55 in accordance with an instruction of the CPU 203. Connected to the IC driver 201 are a shutter sensor 214 for detecting a shutter timing, a CdS sensor 215 for detecting a luminance of a field, and the electromagnetic 57 constituting the stop lock mechanism (cf. FIG. 6 to FIG. 8).

The IC driver 201 includes a shutter driver for driving the electric motor 55 for a shutter switching. The shutter driver drives the electric motor 55 for a shutter switching in accordance with an instruction from the CPU 203 so that a shutter is opened in a timing of a shutter open detected by the shutter sensor 214 and is closed in a timing according to information as to a luminance of a field detected by the CdS sensor 215. This makes it possible to perform an exposure on a film of the most upper layer of a plurality of films in a film pack in accordance with light passing through a photographic lens.

The IC driver 201 further includes a development/barrel driver for driving the electric motor 54 for driving the film development discharge mechanism shown in FIGS. 6 to 8 and the collapse driving ring 2. The development/barrel driver drives the electric motor 54 in accordance with an instruction of the CPU 203 in such a manner that when the instruction of the CPU 203 is an instruction of driving the collapse driving ring 2, the development/barrel driver supplies to the electric motor 54 a positive polarity of current to forward rotate the electric motor 54, and when the instruction of the CPU 203 is an instruction of development and discharge of a film, the development/barrel driver supplies to the electric motor 54 a reverse polarity of current to reversely rotate the electric motor 54.

The IC driver 201 furthermore includes a magnet driver for a stop lock for driving the electromagnetic 57 constituting the stop lock mechanism 56 shown in FIGS. 6 to 8. The magnet driver for a stop lock enables and disables the electromagnetic 57 in accordance with an instruction of the CPU 203.

In the state that the lens barrel is collapsed and the power source is turned off, when the power source is turned on, first, the electromagnetic 57 constituting the stop lock mechanism 56 is enabled, so that the engagement of the locking click 59b with the collapse driving ring 2 is released. Thereafter, the electric motor 54 for driving the collapse driving ring 2 forward rotates to drive the collapse driving ring 2, so that the lens barrel is extended in accordance with the above-mentioned mechanism.

When the lens barrel is extended to a predetermined position, the electric motor 54 is stopped, and then the Electromagnetic 57 is disabled, so that the locking click 59b is engaged with the collapse driving ring 2, and thereby preventing the lens barrel from being inadvertently moved.

Next, a photography is performed through an open and close operation of a shutter. In this case, the electric motor 54 is reversely rotated so that the planetary mechanism 104 is switched to the film development discharge mechanism side as shown in FIG. 8, and then the film development and discharge is performed. At that time, the electromagnetic 57 is kept in a state of being disabled, the collapse driving ring 2 is kept in a state of being blocked in rotation, and the lens barrel is kept in a state of being prevented from being inadvertently moved.

When a far-and-near selecting switch (not illustrated) for switching a far-and-near of a focal position is operated, there is a need to rotate the collapse driving ring 2 to change the focal position. And when the power source is turned off, there is a need to collapse the lens barrel before the power source is turned off indeed. In these cases, prior to a rotation (forward rotation) of the electric motor 54, first, the electromagnetic 57 is enabled so that the engagement of the locking click 59b with the collapse driving ring 2 is released and thus the collapse driving ring 2 becomes rotatable. And thereafter, the electric motor 54 rotates forward so that the collapse driving ring 2 rotates. When the collapse driving ring 2 rotates to a predetermined position, the electric motor 54 stops and the electromagnetic 57 is disabled.

In this manner, according to the present embodiment, it is possible to prevent the lens barrel from being inadvertently moved by the external force to be out of the focal point, without checking the necessary rotation of the collapse driving ring 2. Incidentally, the above-mentioned embodiment is an example of a camera having a two stage collapse type of lens barrel. However, the present invention is applicable also to a camera provided with a collapse type of lens barrel having a member which rotates in accordance with an extension and a collapse and is touchable from the exterior.

As mentioned above, according to a camera of the present invention, it is possible to obtain a good quality of photograph focused, preventing a lens barrel from being shifted to an improper extension position even if the lens barrel is touched.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A camera comprising:
   a camera main frame;
   an electric motor reversely rotatable;
   a lens barrel free in an extension and a collapse with respect to said camera main frame, said lens barrel having a member rotatable in accordance with an extension and a collapse, disposed on a portion exposing in at least an extended state;
   a plurality of mechanisms driven in accordance with a forward rotation and a reverse rotation of said electric motor, said plurality of mechanisms including a lens barrel driving mechanism for transmitting one rotation of the forward rotation and the reverse rotation of said electric motor to said lens barrel and for reciprocating said lens barrel between a collapsed state and the extended state in accordance with said one rotation;

a planetary mechanism for transmitting a rotation of said electric motor to said lens barrel driving mechanism and other mechanisms of said plurality of mechanisms excluding said lens barrel driving mechanism in accordance with a rotary direction of the rotation of said electric motor; and a stop lock mechanism for blocking a movement of said lens barrel by detachably engaging with a rotary transmission member rotating when a rotation of said electric motor is transmitted thereto, said constituting said lens barrel or said lens barrel driving mechanism.

2. A camera according to claim 1, wherein said rotary transmission member is a member constituting said lens barrel.

3. A camera according to claim 1, wherein said stop lock mechanism maintains, while said electric motor drives said lens barrel driving mechanism, a state that an engagement of said stop lock mechanism with said rotary transmission member is released, and said stop lock mechanism maintains, while said electric motor stops and drives said other mechanisms, a state that an engagement of said stop lock mechanism is engaged with said rotary transmission member.

4. A camera according to claim 1, wherein said stop lock mechanism comprises a locking click engaged with said rotary transmission member, and an electromagnet for moving said locking click between an engagement position engaged with said rotary transmission member and a release position released in an engagement with said rotary transmission member.

5. A camera according to claim 4, wherein said locking click is enabled by a spring force in a direction engaging with said rotary transmission member, and said electromagnet moves said locking click in a direction releasing an engagement with said rotary transmission member against the spring force, when said electromagnet is enabled.

6. A camera according to claim 1, wherein said camera is an instant camera of such a type in which a film pack for an instant photography, wherein a plurality of films for an instant photography are laminated in a frame, is mounted on the camera, a film of the most upper layer of the plurality of films laminated in the frame is exposed, and the exposed film is discharged out of the camera while developing developer in the exposed film, and said other mechanisms of said plurality of mechanisms excluding said lens barrel driving mechanism is a film development discharge mechanism through which the exposed film is discharged out of said camera while developing developer into the film.

* * * * *